US011676083B2

(12) United States Patent
Esaka et al.

(10) Patent No.: US 11,676,083 B2
(45) Date of Patent: Jun. 13, 2023

(54) ARRANGEMENT PLANNING DEVICE

(71) Applicant: HONDA MOTOR CO., LTD., Tokyo (JP)

(72) Inventors: Shigeaki Esaka, Tokyo (JP); Toshiaki Hirota, Tokyo (JP); Keiichi Iguchi, Tokyo (JP); Shuji Nakayama, Tokyo (JP); Makoto Takano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 17/274,502

(22) PCT Filed: Jun. 21, 2019

(86) PCT No.: PCT/JP2019/024820
§ 371 (c)(1),
(2) Date: Mar. 9, 2021

(87) PCT Pub. No.: WO2020/054171
PCT Pub. Date: Mar. 19, 2020

(65) Prior Publication Data
US 2022/0051153 A1 Feb. 17, 2022

(30) Foreign Application Priority Data
Sep. 13, 2018 (JP) .............................. JP2018-171174

(51) Int. Cl.
*G06Q 10/00* (2023.01)
*G06Q 10/0631* (2023.01)
(Continued)

(52) U.S. Cl.
CPC ........ *G06Q 10/06312* (2013.01); *B60L 58/16* (2019.02); *H01M 10/48* (2013.01)

(58) Field of Classification Search
None
See application file for complete search history.

(56) References Cited

U.S. PATENT DOCUMENTS 10,643,272 B2 * 5/2020 Takatsuka ............. H01M 10/42
10,650,444 B2 * 5/2020 Takatsuka ............... B60L 50/60
(Continued)

FOREIGN PATENT DOCUMENTS

| JP | 2013-140631 | | 7/2013 |
| JP | 2017-91427 | A | 5/2017 |
| JP | 2017-225342 | A | 12/2017 |

OTHER PUBLICATIONS

JKultgen, Mike, Maximizing Cell Monitoring Accuracy and Data Integrity in Energy Storage Battery Management Systems, Jul. 8, 2015, Analog.com, https://www.analog.com/en/technical-articles/maximizing-cell-monitoring-accuracy-and-data-integrity-in-energy-storage-battery-management-systems.html, p. 1-9. (Year: 2015).*

(Continued)

*Primary Examiner* — Joseph M Waesco
(74) *Attorney, Agent, or Firm* — Rankin, Hill & Clark LLP

(57) ABSTRACT

An arrangement planning device includes: a collection unit that collects state information indicative of a present-time state of each of storage batteries; a prediction calculation unit that calculates a performance indicator of a degree of wear of each of the storage batteries from the state information; an amount-of-operation acquisition unit that obtains a required amount of operation of the storage batteries at each of places of use, the storage batteries being to be placed in the places of use; a policy acquisition unit that obtains an operation policy for each of the storage batteries; and a placement location determination unit that determines a placement location for each of the storage batteries from the places of use, wherein the placement location determination unit determines the placement location for each of the storage batteries based on the required amount of operation, the performance indicator, and the operation policy.

10 Claims, 6 Drawing Sheets

(51) Int. Cl.
*B60L 58/16* (2019.01)
*H01M 10/48* (2006.01)

(56) References Cited

U.S. PATENT DOCUMENTS

| | | | |
|---|---|---|---|
| 10,688,876 B2* | 6/2020 | Takatsuka | G01R 31/006 |
| 11,010,824 B2* | 5/2021 | Takatsuka | H01M 10/42 |
| 11,136,008 B2* | 10/2021 | Lai | B60L 53/305 |
| 2012/0053871 A1* | 3/2012 | Sirard | H01M 10/4207 |
| | | | 702/63 |
| 2017/0062883 A1* | 3/2017 | Nakaya | G01R 31/392 |
| 2018/0260887 A1* | 9/2018 | Takatsuka | B60L 53/665 |
| 2019/0294173 A1* | 9/2019 | Szubbocsev | B60W 60/0023 |
| 2022/0051153 A1* | 2/2022 | Esaka | G06Q 10/0631 |

OTHER PUBLICATIONS

Japanese Office Action dated Oct. 5, 2021 with English translation, 6 pages.
International Search Report, dated Aug. 27, 2019, 1 page.
Written Opinion of the International Searching Auhority dated Aug. 19, 2019 in PCT/JP2019/024820, 4 pages.
International Preliminary Report on Patentability, 8 pages.
Ndian Office Action dated Apr. 27, 2021, 5 pages.
German Office Action dated Mar. 19, 2023, Application No. 11 2019 004 579.2; English translation included, 13 pages.

* cited by examiner

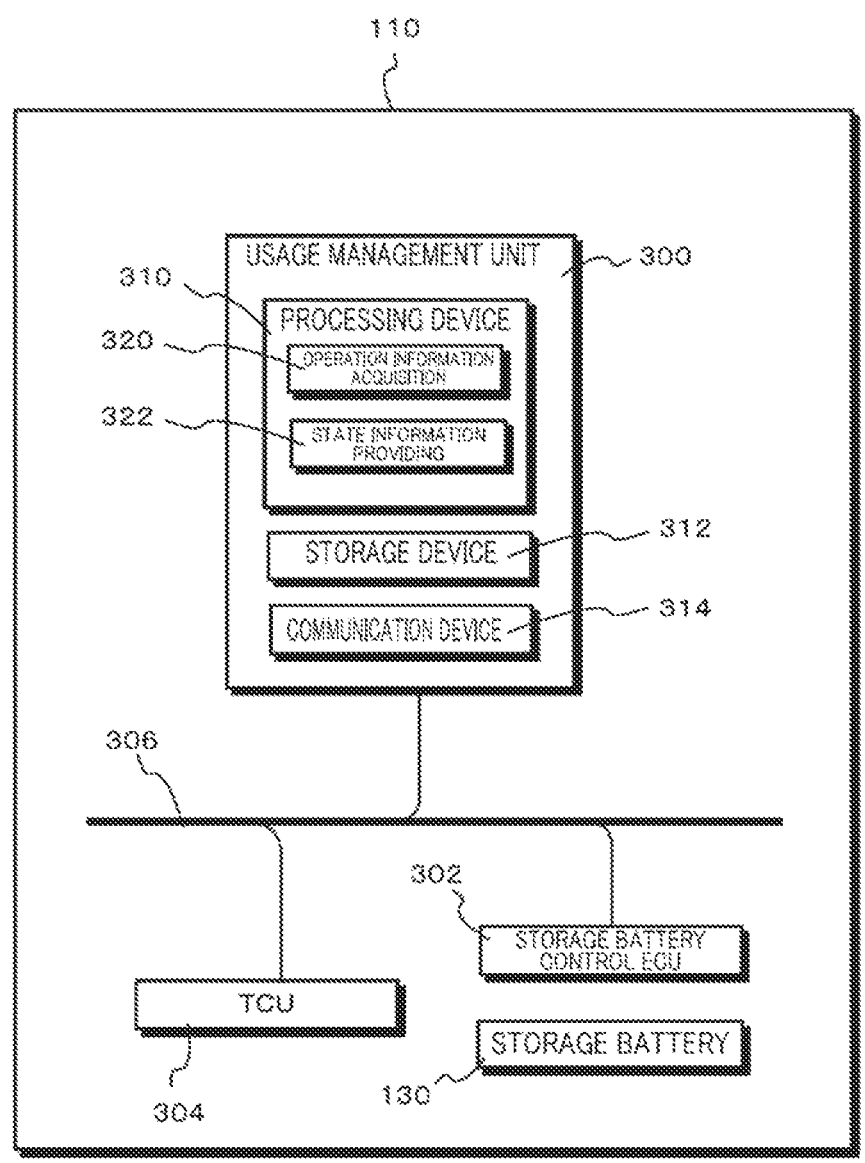

FIG. 4

| BATTERY ID | VEHICLE ID | OPERATION POLICY | INITIAL PERFORMANCE INFORMATION | | STATE INFORMATION | | | | | | | | PERFORMANCE INDICATOR | |
|---|---|---|---|---|---|---|---|---|---|---|---|---|---|---|
| | | | INITIAL CAPACITY | INITIAL Z | CHARGING DATA | | | MAXIMUM CAPACITY | DISCHARGING DATA | | | TEMPERATURE HISTORY | DEGRADATION LEVEL CAPACITY MAINTENANCE RATIO | LIFETIME |
| | | | | | VOLTAGE | CURRENT | OUTPUT Z | | VOLTAGE | CURRENT | OUTPUT Z | | | |
| Bt-1 | Car-1 | PRIORITY TO OPERATION | Qi_1 | Zi_1 | Vc_1(t) | Ic_1(t) | Zc_1(t) | Qc_1 | Vd_1(t) | Id_1(t) | Zd_1(t) | Th_1(t) | Rq_1 | T_1 |
| Bt-2 | Car-2 | PRIORITY TO OPERATION | Qi_2 | Zi_2 | Vc_2(t) | Ic_2(t) | Zc_2(t) | Qc_2 | Vd_2(t) | Id_2(t) | Zd_2(t) | Th_2(t) | Rq_2 | T_2 |
| Bt-3 | Car-3 | PRIORITY TO LEVELING | Qi_3 | Zi_3 | Vc_3(t) | Ic_3(t) | Zc_3(t) | Qc_3 | Vd_3(t) | Id_3(t) | Zd_3(t) | Th_3(t) | Rq_3 | T_3 |
| Bt-4 | Car-4 | PRIORITY TO LEVELING | Qi_4 | Zi_4 | Vc_4(t) | Ic_4(t) | Zc_4(t) | Qc_4 | Vd_4(t) | Id_4(t) | Zd_4(t) | Th_4(t) | Rq_4 | T_4 |
| Bt-5 | Car-5 | PRIORITY TO LEVELING | Qi_5 | Zi_5 | Vc_5(t) | Ic_5(t) | Zc_5(t) | Qc_5 | Vd_5(t) | Id_5(t) | Zd_5(t) | Th_5(t) | Rq_5 | T_5 |
| Bt-6 | Car-6 | PRIORITY TO LEVELING | Qi_6 | Zi_6 | Vc_6(t) | Ic_6(t) | Zc_6(t) | Qc_6 | Vd_6(t) | Id_6(t) | Zd_6(t) | Th_6(t) | Rq_6 | T_6 |
| ... | ... | ... | ... | ... | ... | ... | ... | ... | ... | ... | ... | ... | ... | ... |

FIG.5

| PLACE OF USE ID | QUANTITY OF DEMAND | REQUIRED AMOUNT OF OPERATION (PER DAY) |
|---|---|---|
| S_1 | 3 | Dq_1 |
| S_2 | 3 | Dq_2 |
| ⋮ | ⋮ | ⋮ |

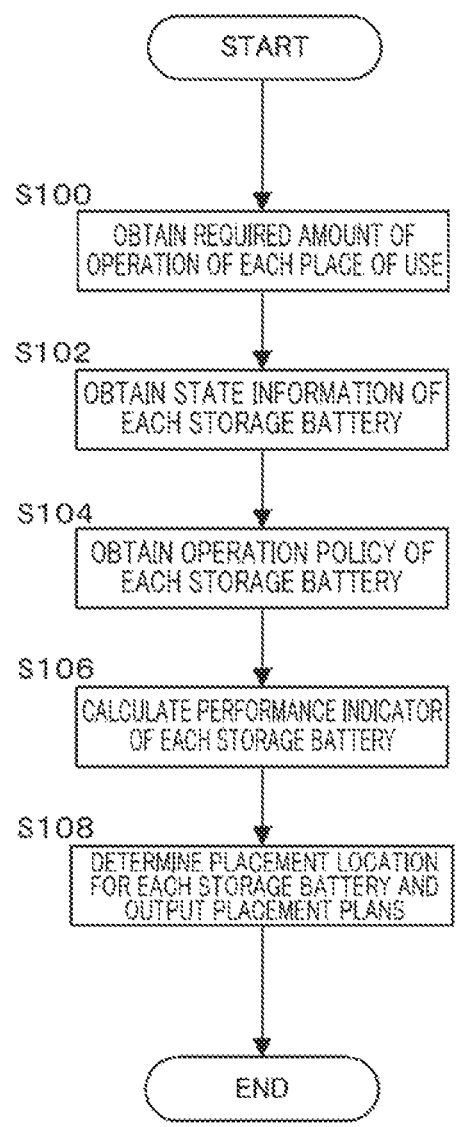

ARRANGEMENT PLANNING DEVICE

TECHNICAL FIELD

The present invention relates to an arrangement planning device for planning the placement locations of storage batteries.

BACKGROUND ART

Storage batteries used in different devices have different lifetimes and different degradation levels depending on their respective operating conditions. To curb the reduction in lifetime of storage batteries, one possible solution may be leveling of the amounts of operation of the storage batteries as a whole to reduce difference in the number of times charging and discharging are performed. Thus, it may be convenient if storage batteries can be placed in devices in accordance with the required amounts of operation in the respective devices.

In addition to the situation where reduction in lifetime of storage batteries needs to be curbed as described above, the relocation of storage batteries may also be desired when there is a demand that the amounts of operation of storage batteries be increased as a whole in a predefined time period. For example, a user may have vehicles equipped with storage batteries by lease and the lease is to expire soon. In that case, it may be more desirable to increase the amounts of operation of the storage batteries or the vehicles to thereby increase the utilization efficiency (for example, in terms of cost effectiveness calculated from the lease payment and sales profit for the remaining lease time), rather than decreasing the amounts of operation of the storage batteries that have degraded to a certain extent due to the use so far to thereby curb the reduction of their lifetimes in the remaining lease time. In this case, there is a desire to place the storage batteries so that the amount of operation of each storage battery is increased before the lease expiration in conformity to a user intent or a usage policy (or an operation policy) as described above and in accordance with the conditions of the storage batteries and the required amounts of operation of facilities such as the vehicles.

A storage battery relocation support device is conventionally known which is to serve the purpose of enabling storage batteries degraded due to use in electrically powered vehicles to be used in other types of facilities to thereby inhibit recycling and other costs and thus reduce the lifecycle costs of the storage batteries. This conventional storage battery relocation support device provides support for relocating storage batteries among different sets of facilities having different requirements in accordance with the degree of performance degradation of each storage battery (see Patent Literature 1).

The conventional storage battery relocation support device described above, however, places emphasis only on the extension of the service time of the storage batteries by repeated relocation to various types of facilities in order to reduce their lifecycle costs. This conventional device does not provide a solution for the relocation of storage batteries in conformity to the user intent or usage policy as described above.

CITATION LIST

Patent Literature

Patent Literature 1: Japanese Patent Laid-Open No. 2013-140631

SUMMARY OF INVENTION

Technical Problem

The present invention, which has been achieved in light of the situation described above, has an object of providing an arrangement planning device that can provide support for optimal placement of storage batteries in conformity to a user intent or a usage policy.

Solution to Problem

In an aspect of the present invention, an arrangement planning device includes: a collection unit that collects state information indicative of a present-time state of each of storage batteries; a prediction calculation unit that calculates a performance indicator of a degree of wear of each of the storage batteries from the state information; an amount-of-operation acquisition unit that obtains a required amount of operation of the storage batteries at each of places of use, the storage batteries being to be placed in the places of use; a policy acquisition unit that obtains an operation policy for each of the storage batteries; and a placement location determination unit that determines a placement location for each of the storage batteries from the places of use, wherein the placement location determination unit determines the placement location for each of the storage batteries based on the required amount of operation, the performance indicator, and the operation policy.

In another aspect of the present invention, the operation policy indicates either priority to an amount of operation so that those of the storage batteries that are assigned with the priority to the amount of operation are used to as high amounts of operation as possible or priority to levelling so that amounts of operation of those of the storage batteries that are assigned with the priority to the levelling are levelled.

In yet another aspect of the present invention, the placement location determination unit determines placement locations for those of the storage batteries that are assigned with the priority to the amount of operation by respective operation policies, such that those of the storage batteries that are assigned with the priority to the amount of operation are placed in accordance with respective degrees of wear determined from respective performance indicators in the places of use in a descending order of the required amount of operation.

In still another aspect of the present invention, the placement location determination unit determines placement locations for those of the storage batteries that are assigned with the priority to the levelling by respective operation policies, such that those of these storage batteries that are assigned with the priority to the levelling are placed in accordance with respective degrees of wear determined from respective performance indicators in the places of use in an ascending order of the required amount of operation.

In still another aspect of the present invention, the storage batteries are storage batteries installed in vehicles and placed in the placement locations determined by the placement location determination unit together with the respective vehicles.

In still another aspect of the present invention, the performance indicator is an indicator of lifetime of each of the storage batteries or an indicator of a degradation level of each of the storage batteries.

The entire disclosure of Japanese Patent Application No. 2018-171174 filed Sep. 13, 2018 is hereby incorporated by reference.

Advantageous Effect of Invention

The aspects of the present invention can provide support for optimal placement of storage batteries in conformity to a user intent or a usage policy.

BRIEF DESCRIPTION OF THE DRAWINGS

FIG. 3 is a diagram illustrating an example configuration of a vehicle equipped with a storage battery whose state information is obtained by the arrangement planning device shown in FIG. 2.

FIG. 4 is a diagram showing an example storage battery management DB stored in a storage device of the arrangement planning device illustrated in FIG. 2.

FIG. 5 is a diagram showing an example place-of-use management DB stored in the storage device of the arrangement planning device illustrated in FIG. 2.

FIG. 6 is a flowchart showing a procedure of processing for creating a placement plan performed by the arrangement planning device illustrated in FIG. 2.

DESCRIPTION OF EMBODIMENTS

Embodiments of the present invention are described below with reference to the drawings.

[1. Arrangement Planning Device and its Usage Examples]

Figure 1:
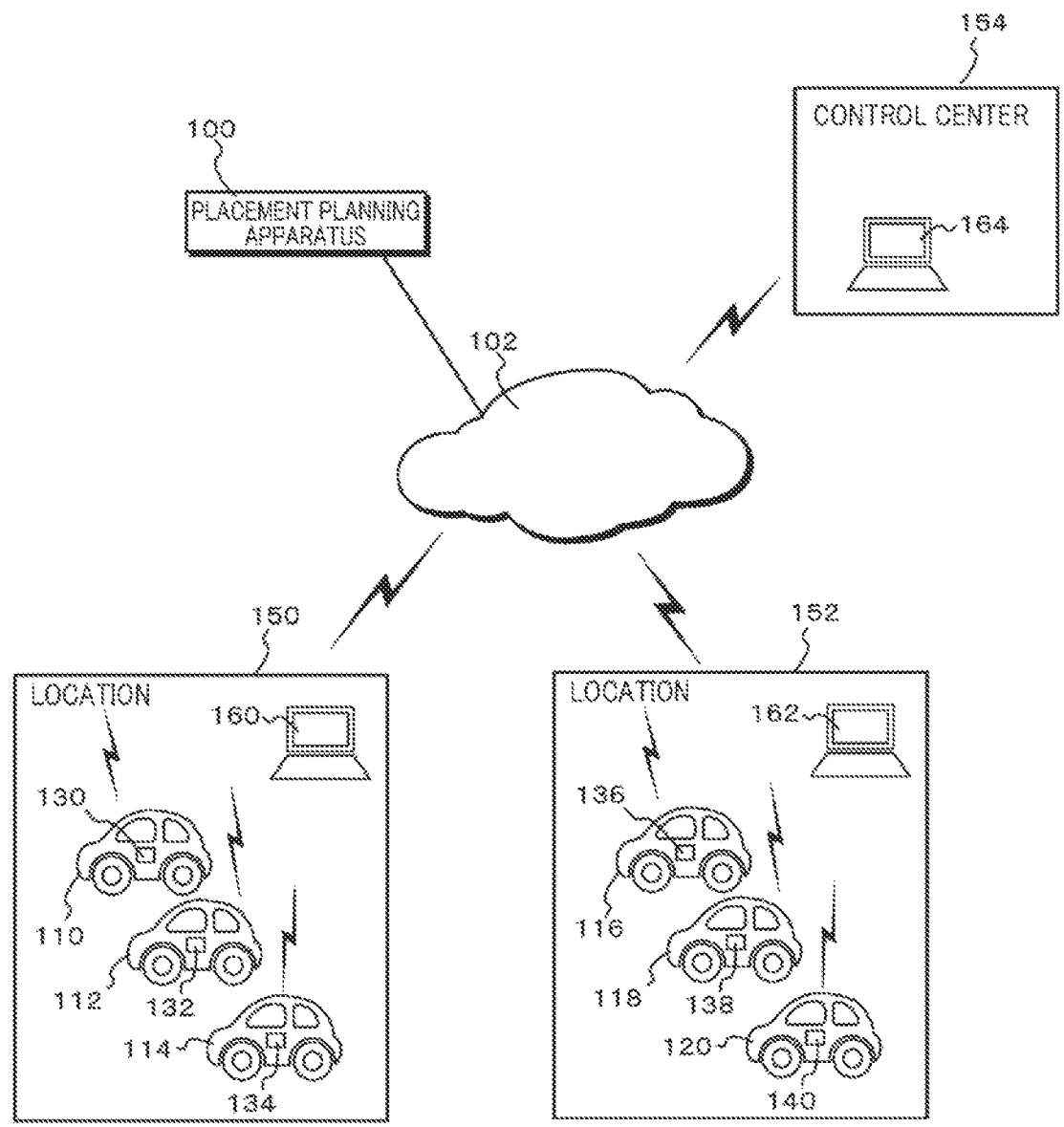
FIG. 1 is a diagram showing an example scene in which an arrangement planning device according to an embodiment of the present invention is used.

FIG. 1 is a diagram illustrating an example scene in which an arrangement planning device according to an embodiment of the present invention is used. A arrangement planning device 100 is communicatively connected to vehicles 110, 112, 114, 116, 118, and 120, which are, for example, electrically powered automobiles, via a network 102. The vehicles 110, 112, 114, 116, 118, and 120 include respective storage batteries 130, 132, 134, 136, 138, and 140 and travel on driving power from the respective storage batteries. The vehicles 110 etc. are placed in, for example, either of two sales locations 150 and 152 of a business, which is a user, for use.

In the example shown in FIG. 1, three of the vehicles 110, 112, and 114 are placed in the location 150 at present, and three of the vehicles 116, 118, and 120 in the location 152. Each of the locations 150 and 152 corresponds to a place of use in which the storage batteries 130 etc. are placed. The vehicles 110 etc. placed in the locations 150 and 152, which are the places of use, are driven to use the storage batteries 130 etc. for the activities of the business. Note that the number of locations and the number of vehicles are not limited to the examples described above, and any numbers of locations and vehicles can be used.

The arrangement planning device 100 is communicatively connected to terminal devices 160 and 162, which are placed in the respective locations 150 and 152, via the network 102. The arrangement planning device 100 is also communicatively connected to a terminal device 164 placed in, for example, a control center 154 of the business via the network 102. The control center 154 develops an operation policy for each of the vehicles 110 etc., that is, an operation policy for each of the storage batteries 130 etc. Here, the vehicles 110 etc. are, for example, assets owned by the business. The control center 154 stores the developed operation policies in a storage device of the terminal device 164.

The arrangement planning device 100 develops plans of the placement of the storage batteries 130 etc., that is, the placement of the vehicles 110 etc., with respect to the locations 150 and 152, which are the places of use. The arrangement planning device 100 transmits the placement plan to the terminal devices 160 and 162 placed in the respective locations 150 and 152. Specifically, the arrangement planning device 100 collects state information indicative of the present-time state of each of the storage batteries 130 etc. from the respective vehicles 110 etc. From the state information collected, the arrangement planning device 100 calculates a performance indicator of the degree of wear of each of the storage batteries and the like. For example, the performance indicator of the degree of wear may be a performance indicator of the lifetime of each of the storage batteries, which is a time period left before failure to satisfy a predetermined performance criterion, or a performance indicator of the degradation level of the degree of wear as compared to the initial performance immediately after the manufacture. The arrangement planning device 100 also obtains, from the terminal devices 160 and 162 placed in the respective locations 150 and 152, a required amount of operation of the storage batteries 130 etc. at each of the locations 150 and 152, that is, a required amount of operation of the vehicles 110 etc. The arrangement planning device 100 also acquires the operation policy for each of the storage batteries 130 etc. from the terminal device 164 in the control center 154.

The arrangement planning device 100 develops plans of the placement of the vehicles 110 etc. equipped with the respective storage batteries 130 etc. in the locations 150 and 152 based on the performance indicators of the respective storage batteries 130 etc. that have been calculated as described above as well as the required amounts of operation at the respective locations 150 and 152 and the operation policies for the storage batteries 130 etc. that have been collected as described above. Then, the arrangement planning device 100 outputs the developed placement plans to the terminal devices 160 and 162 in the respective locations 150 and 152. The placement plans received by the terminal devices 160 and 162 are executed by the staff or the like in the locations 150 and 152 by moving those of the vehicles 110. that are designated to be moved in the placement plans to the corresponding placement locations.

In the present embodiment, the operation policy described above indicates either priority to an amount of operation so that those of the storage batteries 130 etc. that are assigned with the priority to the amount of operation are used to as high amounts of operation as possible or priority to levelling so that amounts of operation of those of the storage batteries 130 etc. that are assigned with the priority to the levelling are levelled. The amount of operation as used herein refers to an amount of operation per 24 hours per day, for example. For example, for those of the storage batteries 130 etc. that are assigned with the priority to the amount of operation by their respective operation policies, the arrangement planning device 100 determines to place these storage batteries in accordance with their respective degrees of wear determined from their respective performance indicators calculated for these storage batteries in the locations 150 and 152 in the descending order of the required amount of operation obtained as described above.

In another example, for those of the storage batteries 130 etc. that are assigned with the priority to the levelling by their respective operation policies, the arrangement planning device 100 determines to place these storage batteries in accordance with their respective degrees of wear determined from their respective performance indicators calculated for these storage batteries in the locations 150 and 152 in the ascending order of the required amount of operation obtained as described above.

[2. Configuration of Arrangement Planning Device 100]

Figure 2:
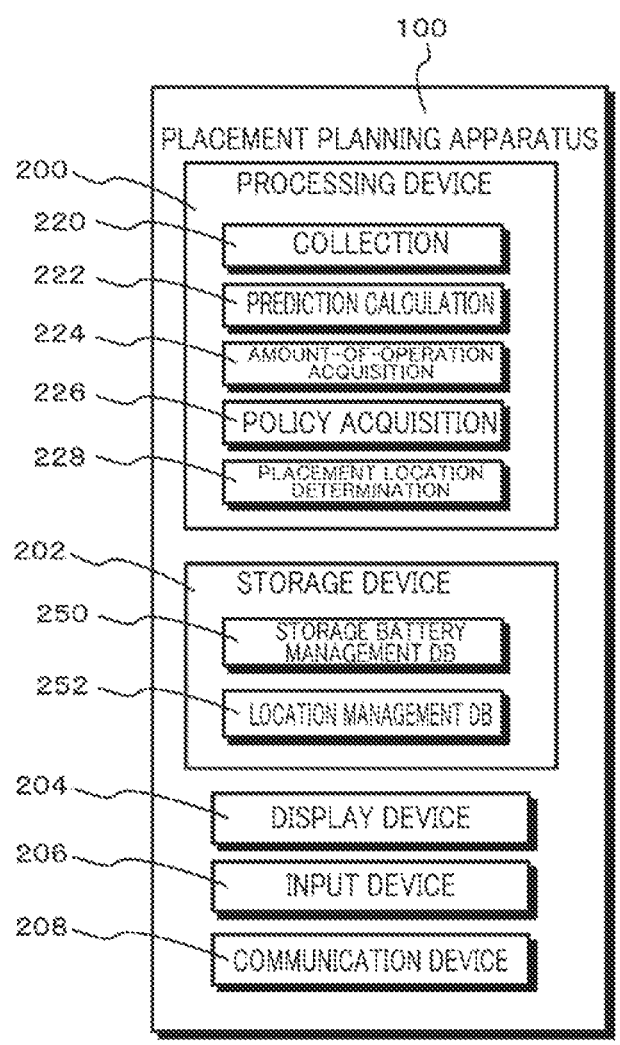
FIG. 2 is a diagram illustrating a configuration of the arrangement planning device according to the embodiment of the invention.

FIG. 2 is a diagram of a configuration of the arrangement planning device 100. The arrangement planning device 100 includes a processing device 200, a storage device 202, a display device 204, an input device 206, and a communication device 208. The display device 204 is, for example, a liquid crystal display device and is controlled by the processing device 200 to display images and text. The input device 206, which is, for example, a touch panel on a display screen of the display device 204, receives an instruction, data, and the like input by an operator and outputs the input information to the processing device 200. The communication device 208 is a transmitter-receiver that performs wire communication and/or wireless communication for connecting the processing device 200 to the network 102.

The storage device 202, which is configured using, for example, a hard disk drive, includes a storage battery management database (storage battery management DB) 250 and a place-of-use management database (place-of-use management DB) 252 stored therein. The storage battery management DB 250 and the place-of-use management DB 252 are described below.

The processing device 200 is a computer including, for example, a processor such as a CPU (central processing unit) and the like. The processing device 200 may include a ROM (read only memory) including a program written therein, a RAM (random access memory) for temporary data storage, and the like. The processing device 200 includes a collection unit 220, a prediction calculation unit 222, an amount-of-operation acquisition unit 224, a policy acquisition unit 226, and a placement location determination unit 228 as functional elements or functional units.

These functional elements included in the processing device 200 are achieved by, for example, the processing device 200, which is a computer, executing programs. The computer programs described above can be stored in any computer-readable storage medium. Alternatively, some or all of the functional elements included in the processing device 200 can be configured by using hardware including one or more electronic circuit components for each of such functional elements.

The collection unit 220 collects state information indicative of the present-time states of the storage batteries 130, 132, 134, 136, 138, and 140 from the respective vehicles 110, 112, 114, 116, 118, and 120 via the network 102. The state information includes, for example, charging/discharging currents, voltages, and output impedances, the charging capacity in the fully charged state (charged at maximum), the cumulative number of times charging and discharging are performed, and/or temperature histories of the respective storage batteries 130 etc.

The collection unit 220 stores the acquired state information in the storage battery management DB 250 as storage battery information with the state information associated with battery IDs, which are IDs for identification of the storage batteries 130, 132, 134, 136.

From the state information collected by the collection unit 220, the prediction calculation unit 222 calculates performance indicators of the degrees of wear of the respective storage batteries 130 etc. The prediction calculation unit 222 then adds the calculated performance indicators to the storage battery information of the respective storage batteries 130 etc. in the storage battery management DB 250 for storage therein. In the present embodiment, the performance indicator of the degree of wear of each of the storage batteries 130 etc. is an indicator of the degradation level or lifetime of each of the storage batteries 130 etc.

More specifically, the indicator of the degradation level is a capacity maintenance ratio of each of the storage batteries 130 etc., which is defined, for example, as a ratio of the charging capacity in the fully charged state of a storage battery at the present time to the initial charging capacity in the fully charged state immediately after the manufacture of the storage battery. Alternatively, the indicator of the degradation level can be, for example, a resistance increase rate of the storage batteries 130 etc., which is defined as a ratio of the direct current component of the output impedance of a storage battery at the present time to the direct current component of the output impedance immediately after the manufacture of the storage battery.

The indicator of the lifetime can be a time period until the capacity maintenance ratio drops below a predetermined value or a time period until the resistance increase ratio exceeds a predetermined value with respect to the present time. The initial capacity and the initial output impedance at the manufacture of each of the storage batteries 130 etc., which are required for the calculation of the degradation level and/or the lifetime, can be stored in advance in the storage battery management DB 250 as the storage battery information in association with the battery IDs of the respective storage batteries. The prediction calculation unit 222 calculates the lifetime from the state information in accordance with, for example, a predetermined degradation model.

FIG. 4 is a diagram illustrating an example of the storage battery management DB 250. In the illustrated example, the storage battery management DB 250 has a tabular format in which the storage battery information for each storage battery is presented in the fourth and subsequent lines. The storage battery information includes, sequentially from the leftmost column of the illustrated table: the battery ID; a vehicle ID; the operation policy obtained by the policy acquisition unit 226; initial performance information stored in advance; the state information collected by the collection unit 220; and the performance indicator calculated by the prediction calculation unit 222. The vehicle ID is an ID for the identification of a vehicle including the storage battery having the corresponding storage battery ID.

The initial performance information includes an initial capacity, which is a charging capacity in the fully charged state (charged 100%) at the manufacture of the storage battery, and an initial impedance (abbreviated as "initial z" in FIG. 4). The state information includes charging data, the maximum capacity, discharging data, and the temperature history. The charging data includes, for example, the voltage, current, and output impedance measured at predefined time intervals at the most recent charging. The discharging data includes the voltage, current, and output impedance measured at predefined time intervals in a most recent predefined time range. The maximum capacity represents a charging capacity in the most recent fully charged state, and the temperature history represents temperatures measured at predefined time intervals in a most recent time period of a predefined length. Note that, in FIG. 4, a symbol with (t)

added to it, for example, Vc_1(t), signifies a set of measurements taken at the predefined time intervals.

Further in FIG. 4, the performance indicator includes the capacity maintenance ratio, which is the degradation level, and the lifetime. The storage battery management DB 250 shown in FIG. 4 is presented as an example, and the storage battery management DB 250 is not limited to this. For example, the performance indicator can be one of the degradation level and lifetime. Also in the initial performance information and/or state information, some of the items shown in FIG. 4 may be omitted and additional data not shown in the FIG. 4 may be provided.

With reference to FIG. 2, the amount-of-operation acquisition unit 224 obtains a required amount of operation of the storage batteries 130 etc. at each of the locations 150 and 152, in which the storage batteries 130 etc. are to be placed, from the respective terminal devices 160 and 162. The required amount of operation can be, for example, a required amount of operation per vehicle (that is, an average required amount of operation). The respective required amounts of operation are input in the terminal devices 160 and 162 in the respective locations 150 and 152 by their respective managers or the like. The amount-of-operation acquisition unit 224 stores the obtained required amounts of operation in the place-of-use management DB 252 together with the respective IDs identifying the locations 150 and 152.

FIG. 5 is a diagram illustrating an example of the place-of-use management DB 252. In the illustrated example, the place-of-use management DB 252 has a tabular format in which amount-of-operation information of the locations 150 etc., which are the places of use, is presented in the second and subsequent lines. The amount-of-operation information includes, sequentially from the leftmost column of the illustrated table: a place-of-use ID, which is an ID for the identification of each of the locations 150 etc.; a quantity of demand, which represents the number of required storage batteries at each of the locations; and the required amount of operation, which is the average value of required amounts of operation of the storage batteries. The required amount of operation can be, for example, an amount of discharge required per day.

With reference back to FIG. 2, the policy acquisition unit 226 obtains the operation policy for each of the storage batteries 130 etc. from the terminal device 164 of the control center 154. As described above, the operation policy indicates either the priority to the amount of operation so that the storage battery is used to as high an amount of operation as possible, or the priority to the levelling so that the amount of operation of the storage battery is levelled with the amounts of operation of other storage batteries.

The placement location determination unit 228 determines a placement location for each of the storage batteries 130 etc. from the locations 150 and 152. In the present embodiment, the storage batteries 130 etc. are installed in the respective vehicles 110 etc. and placed in the placement locations together with the respective vehicles 110 etc.; thus, the placement location of the storage batteries 130 etc. is equivalent to the placement location of respective vehicles 110.

The placement location determination unit 228 determines the placement locations for the storage batteries 130 etc. based on, among others, the performance indicators calculated by the prediction calculation unit 222, the required amounts of operation obtained by the amount-of-operation acquisition unit 224, and the operation policies obtained by the policy acquisition unit 226.

Specifically, for those of the storage batteries 130 etc. that are assigned with the priority to the amount of operation by their respective operation policies, the placement location determination unit 228 determines to place these storage batteries in accordance with their respective degrees of wear determined from their respective performance indicators calculated for these storage batteries in the locations 150 etc. in the descending order of the required amount of operation obtained as described above.

For example, placing those of the storage batteries 130 etc. that are assigned with the priority to the amount of operation by their respective operation policies in the descending order of the degree of wear in the locations in the descending order of the required amount of operation will increase the number of storage batteries 130 etc. that can be exhausted. In contrast, placing those of the storage batteries 130 etc. that are assigned with the priority to the amount of operation by their respective operation policies in the ascending order of the degree of wear in the locations in the descending order of the required amount of operation will enable use of these storage batteries such that their degrees of wear become closer to one another (their degrees of wear are levelled). Which one of the methods described above to be used for the placement can be determined in advance and described in, for example, a program executed by the processing device 200, so that the placement location determination unit 228 can be instructed.

Additionally, for those of the storage batteries 130 etc. that are assigned with the priority to the levelling by their respective operation policies, the placement location determination unit 228 determines to place these storage batteries in accordance with their respective degrees of wear determined from their respective performance indicators calculated for these storage batteries in the locations 150 etc. in the ascending order of the required amount of operation obtained as described above. Such placement enables those of the storage batteries that are assigned with the priority to the levelling by their respective operation policies to reduce the numbers of times charging and discharging are performed, thereby mitigating the reduction of their lifetimes due to repeated charging and discharging.

For example, placing those of the storage batteries 130 etc. that are assigned with the priority to the levelling by their respective operation policies in the ascending order of the degree of wear in the locations in the ascending order of the required amount of operation will decrease the amounts of operation more for newer storage batteries with smaller cumulative amounts of operation and thus can avoid rapid wear of the new batteries. In contrast, placing those of the storage batteries 130 etc. that are assigned with the priority to the levelling by their respective operation policies in the descending order of the degree of wear in the locations in the ascending order of the required amount of operation will enable use of these storage batteries such that their degrees of wear become closer to one another (their degrees of wear are levelled). As in the case with the operation policies with the priority to the amount of operation, which one of the methods described above to be used for the placement can be determined in advance and described in, for example, a program executed by the processing device 200, so that the placement location determination unit 228 can be instructed.

When those of the storage batteries 130 etc. that are assigned with the priority to the levelling by their operation policies are placed, it is desirable to control the operation of more than one such storage batteries, such as using one of these storage batteries while stopping the use of the others, so as to level the amounts of operation of these storage batteries. Thus, it is desirable that, for example, the placement location determination unit 228 operate to place two or more storage batteries that are assigned with the priority to the levelling in one place of use (the location 150 or 152).

The placement location determination unit 228 can be configured to predict the operable time length from the degradation level using, for example, an appropriate degradation model when the performance indicator is the indicator of the degradation level. Alternatively, the placement location determination unit 228 can be configured to calculate a value of the indicator of the degradation level corresponding to a predefined operable time length in advance and compare said calculated value to the value of the indicator of the degradation level calculated as described above to thereby determine whether an operable time length determined from the calculated performance indicator is equal to or less than a predefined value.

The arrangement planning device 100 configured as described above determines placement locations for the storage batteries 130 etc. based on their respective operation policies set by a user for the storage batteries 130 etc., the performance indicators of the degree of wear calculated from the state information at the present time of the storage batteries 130 etc., and the required amounts of operation at the locations 150 and 152, which are the places of use. Therefore, the arrangement planning device 100 can enable placement of the storage batteries 130 etc. in conformity to a usage strategy of a user for each of the storage batteries 130 etc., such as, for example, the priority to the amount of operation or the priority to the levelling, to thereby provide support for optimal placement of the storage batteries 130 etc. that agrees with the usage strategy of the user.

[3. Configuration of Vehicles 110 Etc.]

A configuration of the vehicles 110 etc., from which the arrangement planning device 100 obtains the state information of the storage batteries 130 etc., is described next as an example.

FIG. 3 is a diagram illustrating an example configuration for transmission processing of the state information, which can be used in each of the vehicles 110 etc. The vehicles 110 etc. can use a similar configuration for the transmission processing of the state information; thus, the configuration of the vehicle 110 is presented in FIG. 3 as an example.

In the illustrated example, the vehicle 110 includes: a usage management unit 300, which is configured as, for example, an electronic control unit (ECU); a storage battery control ECU 302; and a telematics control unit (TCU) 304. The usage management unit 300, the storage battery control ECU 302, and the TCU 304 are communicatively connected to one another via an in-vehicle network bus 306. The in-vehicle network bus 306 is, for example, a CAN bus in conformance with CAN (controller area network) communication standards.

The storage battery control ECU 302 is connected to the storage battery 130 installed in the vehicle 110 to control the charging/discharging operations of the storage battery 130 and obtain operation information of the storage battery 130 from a sensor (not shown) provided on the storage battery 130. The storage battery control ECU 302 measures charging/discharging voltages, currents, and output impedances, the charging capacity in the fully charged state, the temperature of the storage battery 130, and the like at predefined time intervals respectively determined in advance and obtains the measurement data as the operation information. The TCU 304, which includes a wireless device, communicates with the arrangement planning device 100 via the Internet connected to a public line or the like.

The usage management unit 300 includes a processing device 310, a storage device 312, and a communication device 314. The storage device 312 is configured using, for example, a volatile and/or nonvolatile semiconductor memory and/or a hard disk drive. The storage device 312 stores data necessary for processing performed by the processing device 310 in advance or as the processing proceeds. The communication device 314 is, for example, a CAN transceiver for communication with other devices such as the storage battery control ECU 302 via the in-vehicle network bus 306, which is a CAN bus.

The processing device 310 is a computer including, for example, a processor such as a CPU. The processing device 310 may include a ROM including a program written therein, a RAM for temporary data storage, and the like. The processing device 310 includes an operation information acquisition unit 320 and a state information providing unit 322 as functional elements or functional units.

These functional elements included in the processing device 310 are achieved by, for example, the processing device 310, which is a computer, executing programs. The computer programs described above can be stored in any computer-readable storage medium.

The operation information acquisition unit 320 obtains the operation information of the storage battery 130 from the storage battery control ECU 302 to store most recent charging data, namely, the voltage, current, and output impedance at the most recent charging and the charging capacity in the fully charged state, in the storage device 312 as charging information. The operation information acquisition unit 320 also obtains the operation information described above at regular time intervals to store discharging data of the storage battery 130 in a most recent predefined time period, namely, discharging voltage, current, and output impedance, in the storage device 312.

The operation information acquisition unit 320 also obtains the operation information described above at regular time intervals to store temperature data of the storage battery 130 in a most recent predefined time period in the storage device 312 as the temperature history.

In response to, for example, receiving a request transmitted by the arrangement planning device 100 via the network 102, the state information providing unit 322 obtains from the storage device 312 the charging data, discharging data, and temperature history stored by the operation information acquisition unit 320 and transmits these pieces of information to the arrangement planning device 100 as the state information.

[4. Configuration of Terminal Devices 160 Etc.]

The terminal devices 160, 162, and 164 are, for example, personal computers.

The terminal devices 160 and 162 receive placement plans transmitted by the arrangement planning device 100 via the network 102 and present the received placement plans on respective display devices (not shown). In response to receiving a request message or the like transmitted by the arrangement planning device 100 via the network 102, the terminal devices 160 and 162 transmit information on the required amounts of operation at the respective locations 150 and 152 input by operators in advance to the arrangement planning device 100.

In response to receiving a request message or the like transmitted by the arrangement planning device 100 via the network 102, the terminal device 164 transmits operation policies for the storage batteries 130 etc. input in advance by an operator to the arrangement planning device 100.

The terminal devices 160, 162, and 164 can each perform the operations described above by, for example, executing dedicated application software according to conventional technology.

[5. Processing for Creating Placement Plan in Arrangement Planning Device 100]

Processing for creating a placement plan for each of the storage batteries 130 etc. performed by the arrangement planning device 100 is described next using a flowchart shown in FIG. 6. This processing starts either regularly at predefined time intervals or when the arrangement planning device 100 receives a request message or the like for starting the processing from any one of the terminal devices 160, 162, and 164, which are connected to the arrangement planning device 100 via the network 102. The arrangement planning device 100 may receive such a request message or the like from, for example, the terminal device 164 in the control center 154.

On start of the processing, the amount-of-operation acquisition unit 224 of the arrangement planning device 100 obtains information on the required amounts of operation from the terminal devices 160 and 162 in the respective locations 150 and 152, which are the places of use, and stores the information in the place-of-use management DB 252 (S100). The place-of-use management DB 252 thus has information as described in FIG. 5 stored therein.

The collection unit 220 of the arrangement planning device 100 collects the state information of the storage batteries 130 etc. included in the respective vehicles 110 etc. from the respective vehicles 110 etc. (S102). The collection unit 220 stores the collected state information in, for example, the storage battery management DB 250 stored in the storage device 202. The policy acquisition unit 226 of the arrangement planning device 100 obtains information on the operation policy for each of the storage batteries 130 etc. from the terminal device 164 in the control center 154 (S104). The policy acquisition unit 226 adds the obtained operation policies to, for example, the storage battery management DB 250 in the storage device 202 for storage therein.

The prediction calculation unit 222 of the arrangement planning device 100 calculates a performance indicator of the degree of wear for each of the storage batteries 130 etc. based on the corresponding state information of the storage batteries 130 etc. included in the respective vehicles 110 etc. (S106). The prediction calculation unit 222 adds the calculated performance indicators to, for example, the storage battery management DB 250 in the storage device 202 for storage therein. The storage battery management DB 250 thus has information as described in FIG. 4 stored therein.

Then, based on the state information, performance indicator, and operation policy of each of the storage batteries 130 etc. and the required amount of operation at each of the locations 150 and 152, the placement location determination unit 228 of the arrangement planning device 100 determines the placement location of each of the vehicles 110 etc. equipped with the respective storage batteries 130 etc. as the placement location for each of the storage batteries 130 etc. and outputs (S108) a resultant placement plan indicating the placement location of each of the storage batteries 130 etc. And then, the placement location determination unit 228 finishes this processing.

The placement plans determined and output by the placement location determination unit 228 are transmitted by, for example, the processing device 200 of the arrangement planning device 100 to the terminal devices 160 and 162 in the respective locations 150 and 152 and the terminal device 164 in the control center 154 for presentation on respective display screens of the terminal devices 160, 162, and 164. In the locations 150 and 152, if any of the storage batteries 130 etc. should be moved to the other location according to the placement plans presented on the respective display devices, those of the vehicles 110 etc. equipped with the affected ones of the storage batteries 130 etc. are moved to their designated placement locations shown in the placement plans by staff members of the respective locations 150 and 152.

Subsequently, if, for example, the locations 150 and 152 that are designated placement locations are to transmit reports of the completed placement via the respective terminal devices 160 and 162 to the arrangement planning device 100, the arrangement planning device 100 can notify the terminal device 164 in the control center 154 of the completion of the move when those of the storage batteries 130 etc. that should be moved have been all moved.

[6. Modifications]

The present invention is not limited to the configurations described in the foregoing embodiment, and various embodiments can be achieved without departing from the spirit of the invention.

For example, while the user of the storage batteries 130 etc., the placement of which is determined by the arrangement planning device 100, is a business and the places of use of the storage batteries 130 etc. are the locations 150 and 152, which are sales locations or the like of the business in the present embodiment, this is not a limitation. The user may be an individual, a local government, or a service provider leasing storage batteries, who uses a plurality of storage batteries at a plurality of places of use.

While the storage batteries 130 etc. are installed in the vehicles 110 etc., which are electrically powered automobile, and placed together with the vehicles 110 etc. in the designated placement locations in the present embodiment, this is not a limitation. For example, the vehicles 110 etc. can be power assisted bicycles, and the storage batteries 130 etc. can be used as detachably attached to the vehicles 110 etc. that are the power assisted bicycles. Thus, the storage batteries 130 etc. can be moved to designated placement locations as detached from the vehicles 110 etc. and then attached to other vehicles that are power assisted bicycles at the designated placement locations for use.

Instead of being used as installed in the vehicles 110 etc., the storage batteries 130 etc. may be placed at factories or houses for use to operate facilities provided for the factories or houses. In this case, the arrangement planning device 100 can be configured to determine the placement locations of the storage batteries 130 etc. by obtaining information on the required amounts of operation at the factories or houses, which are the places of use, and obtaining the operation policies of the storage batteries 130 etc. determined by an entity that has the authorization to determine the operation policies, that is, a business that owns the factories or a local government or a service provider that manages the houses.

While the places of use for the storage batteries 130 etc. are the locations 150 and 152 themselves in which the storage batteries 130 etc. can be used in the present embodiment, this is not a limitation. For example, a place of use can be a specific application target, such as "a third storage battery needed" in each of the locations 150 etc. where the storage batteries 130 etc. are used. In this case, the place-of-use management DB 252 can be a database that indicates a required amount of operation of each specific application target serving as a place of use, such as "a required amount of operation of a first storage battery needed" in each of the locations 150 etc.

While the operation policies and required amounts of operation are obtained from the terminal devices 160 etc. in the present embodiment, this is not a limitation. Information on the operation policy and/or required amount of operation can be input by a user either in advance or at regular time intervals via, for example, the input device 206 into the arrangement planning device 100 for storage in the storage device 202.

While the placement plans developed by the arrangement planning device 100 are transmitted to the terminal devices 160 etc. in the present embodiment, this is not a limitation. Placement plans can be transmitted by the arrangement planning device 100 to any device or terminal that is considered convenient by a user to execute the plans. Such device or terminal can be, for example, a navigation device, a display audio device, or other in-vehicle devices included in the vehicle 110, or a mobile terminal or the like owned by a user.

While the arrangement planning device 100 is a stand-alone device connected to the network 102 in the present embodiment, this is not a limitation. For example, the arrangement planning device 100 may be achieved by executing a dedicated application program in a personal computer or a mobile terminal that can provide necessary processing capacity corresponding to the number of places of use and the number of storage batteries for which placement plans are developed.

[7. Recapitulation]

As described above, the arrangement planning device 100 according to the present embodiment includes: the collection unit 220 that collects the state information indicative of the present-time states of the storage batteries 130 etc.; the prediction calculation unit 222 that calculates the performance indicator of the degree of wear of each of the storage batteries 130 etc. from the state information; and the amount-of-operation acquisition unit 224 that obtains a required amount of operation of the storage batteries 130 etc. at each of the locations 150 etc., which are places of use in which the storage batteries 130 etc. are to be placed. The arrangement planning device 100 also includes: the policy acquisition unit 226 that obtains an operation policy for each of the storage batteries 130 etc.; and the placement location determination unit 228 that determines a placement location for each of the storage batteries 130 etc. from the locations 150 etc., which are places of use. The placement location determination unit 228 determines the placement location for each of the storage batteries 130 etc. based on the required amount of operation, the performance indicator, and the operation policy.

This configuration can enable placement of the storage batteries 130 etc. in conformity to a usage strategy of a user for each of the storage batteries 130 etc. to thereby provide support for optimal placement of the storage batteries 130 etc. that agrees with the usage strategy of the user.

Furthermore, the placement location determination unit 228 of the arrangement planning device 100 determines placement locations for those of the storage batteries 130 etc. that are assigned with the priority to the amount of operation by their respective operation policies such that these storage batteries are placed in accordance with their respective degrees of wear determined from their respective performance indicators in the locations 150 etc. in the descending order of the required amount of operation.

Furthermore, the placement location determination unit 228 of the arrangement planning device 100 determines placement locations for those of the storage batteries 130 etc. that are assigned with the priority to the levelling by their respective operation policies such that these storage batteries are placed in accordance with their respective degrees of wear determined from their respective performance indicators in the locations 150 etc. in the ascending order of the required amount of operation.

This configuration can provide support for the placement of the storage batteries 130 etc. such that the storage batteries 130 etc. are used differently, such as to increase the utilization efficiency (the cost effectiveness, for example) by increasing the amounts of operation of those of the storage batteries 130 etc. whose expiration dates for lease or the like are close, or to avoid investment to purchase replacements by curbing the reduction of the lifetimes of the storage batteries due to increase of the number of times charging and discharging are performed.

Additionally, the storage batteries 130 etc. are storage batteries installed in the vehicles 110 etc. and placed in placement locations determined by the placement location determination unit 228 of the arrangement planning device 100 together with the respective vehicles 110 etc. This configuration can optimize the placement of the electrically powered vehicles, which travel on driving power from the storage batteries, based on the operation policies of a user.

Additionally, the performance indicator used in the arrangement planning device 100 is an indicator of the lifetime or degradation level of each of the storage batteries 130 etc. This configuration can provide support for optimal placement of the storage batteries 130 etc. by determining the degree of wear of each of the storage batteries 130 etc. appropriately.

REFERENCE SIGNS LIST

100 . . . arrangement planning device, 102 . . . network, 110, 112, 114, 116, 118, 120 . . . vehicle, 130, 132, 134, 136, 138, 140 . . . storage battery, 150, 152 . . . location, 154 . . . control center, 160, 162, 164 . . . terminal device, 200, 310 . . . processing device, 202, 312 . . . storage device, 204 . . . display device, 206 . . . input device, 208, 314 . . . communication device, 220 . . . collection unit, 222 . . . prediction calculation unit, 224 . . . amount-of-operation acquisition unit, 226 . . . policy acquisition unit, 228 . . . placement location determination unit, 250 . . . storage battery management database (storage battery management DB), 252 . . . place-of-use management database (place-of-use management DB), 300 . . . usage management unit, 302 . . . storage battery control ECU, 304 . . . telematics control unit (TCU), 306 . . . in-vehicle network bus, 320 . . . operation information acquisition unit, 322 . . . state information providing unit

The invention claimed is:

1. An arrangement planning device, comprising a processor, wherein the processor:
is communicatively connected to terminal devices respectively placed in a plurality of locations, and to a plurality of storage batteries installed in a plurality of vehicles via a network, wherein the plurality of vehicles are placed in at least one of the plurality of locations and travel on driving power from the plurality of storage batteries;
collects operation information of each storage battery in the plurality of storage batteries over the network, from a plurality of storage battery control electronic control units respectively included in each vehicle and connected to at least one corresponding storage battery for obtaining operation information of the storage battery at a predefined time interval, the operation information being state information indicative of a present-time state of each of the storage batteries;

calculates a performance indicator, of each of the storage batteries, that is an indicator of a degradation level of each of the storage batteries or an indicator of lifetime of each of the storage batteries by comparing the state information and an initial state of the respective storage batteries immediately after a manufacture of the respective storage batteries that is stored in a memory;

obtains, from the terminal devices via the network, a required amount of operation which is an average value of discharge amounts required for each of the storage batteries at each of places of use, the storage batteries being to be placed in the places of use;

obtains an operation policy which is set for each of the storage batteries; and determines a placement location for each of the storage batteries from the places of use, wherein the processor determines the placement location for each of the storage batteries in conformity to the operation policy which is set for each of the storage batteries, based on the required amount of operation, and the performance indicator.

2. The arrangement planning device according to claim 1, wherein the operation policy which is set for each of the storage batteries indicates either priority to an amount of operation in which those of the storage batteries that are assigned with the priority to the amount of operation are used so that the amount of operation which is an amount of discharge per a predetermined time is as large as possible or priority to levelling in which the amounts of operation of those of the storage batteries that are assigned with the priority to the levelling are levelled.

3. The arrangement planning device according to claim 2, wherein the processor determines placement locations for those of the storage batteries that are assigned with the priority to the amount of operation by respective operation policies, such that those of the storage batteries that are assigned with the priority to the amount of operation are placed, in accordance with respective degrees of wear determined from respective performance indicators, in the places of use in a descending order of the required amount of operation.

4. The arrangement planning device according to claim 2, wherein the processor determines placement locations for those of the storage batteries that are assigned with the priority to the levelling by respective operation policies, such that those of the storage batteries that are assigned with the priority to the levelling are placed, in accordance with respective degrees of wear determined from respective performance indicators, in the places of use in an ascending order of the required amount of operation.

5. The arrangement planning device according to claim 1, wherein the storage batteries are storage batteries installed in vehicles and placed in the placement locations determined by the processor together with the respective vehicles.

6. The arrangement planning device according to claim 3, wherein the processor determines placement locations for those of the storage batteries that are assigned with the priority to the levelling by respective operation policies, such that those of the storage batteries that are assigned with the priority to the levelling are placed, in accordance with respective degrees of wear determined from respective performance indicators, in the places of use in an ascending order of the required amount of operation.

7. The arrangement planning device according to claim 2, wherein the storage batteries are storage batteries installed in the plurality of vehicles and placed in the placement locations determined by the processor together with the respective vehicles.

8. The arrangement planning device according to claim 3, wherein the storage batteries are placed in the placement locations determined by the processor together with the respective vehicles.

9. The arrangement planning device according to claim 4, wherein the storage batteries are placed in the placement locations determined by the processor together with the respective vehicles.

10. The arrangement planning device according to claim 1, wherein the indicator of the degradation level of the storage battery is indicated by a capacity maintenance ratio that is defined as a ratio of a charging capacity in a fully charged state, with a current charging capacity, of the storage battery to an initial charging capacity, in the fully charged state immediately after the manufacture of the storage battery, stored in the memory, or a resistance increase rate of the storage battery that is defined as a ratio of a direct current component of an output impedance of the storage battery at a present time to the direct current component of the output impedance, immediately after the manufacture of the storage battery, stored in the memory, and the indicator of the lifetime of the storage battery is a time period until the capacity maintenance ratio drops below a first predetermined value with respect to the present time or a time period until the resistance increase ratio exceeds a second predetermined value with respect to the present time.

* * * * *